United States Patent Office
2,889,209
Patented June 2, 1959

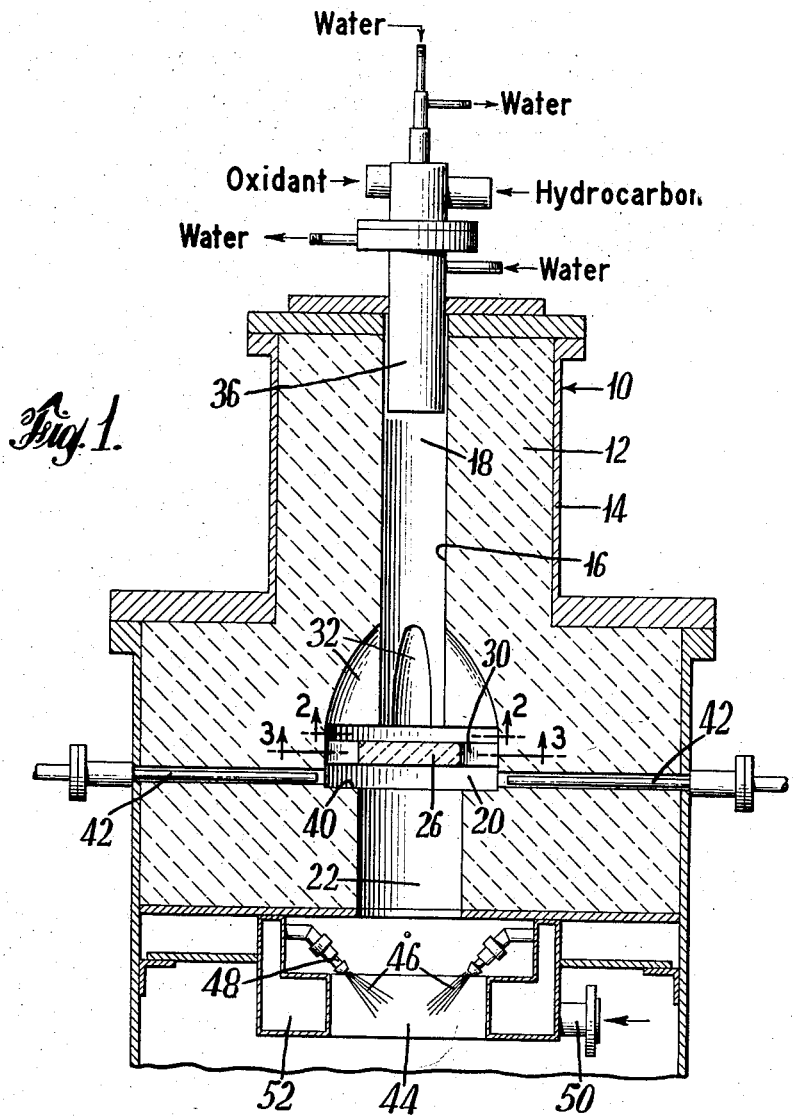
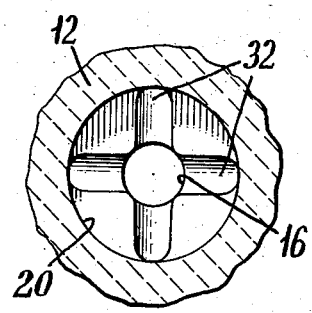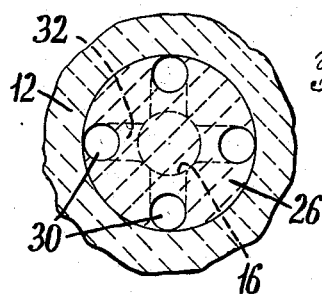

2,889,209

PARTIAL OXIDATION REACTOR

Arlan B. Hale, Texas City, Tex., assignor to Union Carbide Corporation, a corporation of New York Application June 21, 1955, Serial No. 517,033

3 Claims. (Cl. 23—277)

The present invention relates to the production of acetylene from hydrocarbons, such as methane, by the partial oxidation thereof.

Heretofore, many systems have been proposed for the production of acetylene by the partial oxidation of hydrocarbons but none of these processes gives desirable large-volume, high-percentage yields of acetylene together with long periods of trouble-free continuous operation.

In one process, a non-stoichiometric (insufficient oxygen for complete combustion) mixture of preheated saturated hydrocarbon gas (natural gas) and oxygen is passed through a multi-opening plate and there ignited to utilize the plate as a flame holder. The hot combustion products containing acetylene are rapidly quenched in water and the acetylene is removed from the other combustion products. The above process employs a gas flow rate during mixing of approximately 300 feet per second and is fraught with operating difficulties such as preignition, and erratic operation.

It has been found that, to obtain high yields of acetylene in a process of partial oxidation of a hydrocarbon, it is imperative that certain essential requirements are met. These requirements are : (1) Both the hydrocarbon and oxidant should be preheated prior to mixing to as high a temperature as possible without causing preignition during mixing; (2) if premixing is used, intimate mixing of the preheated hydrocarbon and preheated oxidant should be effected in as short a time interval as possible to prevent preignitions at the mixing point and to minimize preheat loss; and (3) the partial oxidation reaction of methane or other hydrocarbons to form acetylene should be effected at a relatively high temperature in as short a time interval as possible to maintain high acetylene yields.

More specifically, for a given mixture of reactants, the percentage of acetylene in the product has been found to be greatly effected by the temperature to which the reactants are preheated, since the volume of acetylene produced is favored by high temperature. The extent of preheating to be effected is limited for practical reasons to a maximum temperature that will not result in excessive preignitions at the mixing point. Should the oxidant stream be preheated to too high a temperature, oxidation of the interior of the metal oxidant conduits would occur. Should the hydrocarbon be preheated to too high a temperature, pyrolysis would occur to cause harmful carbon deposition on the walls of the apparatus and result in plugging of the preheater tubes.

The above-mentioned rapid and intimate mixing of preheated hydrocarbon and oxidant at the highest practical temperatures is required for high yields of acetylene in the reaction products. This is required, among other reasons, to minimize the loss of some of the pre-heat through the apparatus walls which occurs during mixing if the mixer is cooled by water or other coolant. Slower mixing would, of course, increase the loss of preheat from the reactants and effect the yield and volume percentage of acetylene in the yield.

In addition, rapid mixing eliminates regions of high oxygen concentrations which tend to cause pre-ignition prior to the achievement of an intimate and uniform mixture.

Similarly, it has been taught in the prior art that rapid quenching of the reaction products is required to prevent decomposition of the contained acetylene. The quenching should not be carried out too close to the reaction zone flame, and should not be too remote from the reaction zone to permit acetylene decomposition.

In application Serial No. 516,936, filed concurrently herewith by A. B. Hale and S. E. Parish, now U.S. Patent 2,868,856, issued January 13, 1959, apparatus is described for treating large volumes of reactants to produce high-volume-percent yields of acetylene by the partial oxidation of hydrocarbons in a high-temperature reaction zone. Such apparatus, while it provides means for adequately treating large volumes of stock, does not accomplish instantaneous ignition of the entire reactant stream across its entire cross-section. It has been found that for highest volume-percent yields of acetylene it is important to properly position in time the quenching operation downstream of the reaction zone and constantly maintain the point of ignition and flame holding across the entire cross-section of the entire reactant gas stream.

Accordingly it is the main object of the present invention to provide means for treating large volumes of reactants to produce high-volume-percent yields of acetylene by the partial oxidation of hydrocarbons in a high-temperature reaction zone in which the reaction is ignited and the flame held at a constant location over the entire cross-section of the reactant stream.

In the drawings:

Fig. 1 is a partial vertical sectional view of apparatus embodying the invention;

Fig. 2 is a sectional view taken along the line 2—2 of Fig. 1; and

Fig. 3 is a sectional view taken along the line 3—3 of Fig. 1.

In accordance with the present invention, apparatus is provided for dividing a mixture of gaseous hydrocarbon and oxidant into a plurality of streams and introducing said streams into a reaction zone radially head-on to produce turbulent flow and igniting said streams in the region of turbulent flow by means of at least one flame holder to produce the initiation of the partial oxidation reaction. This ignition is accomplished and burning continues across the entire cross-section of the reactant stream passing through the reaction zone, such burning across the entire cross-section being termed "massive burning" herein.

Referring specifically to the drawing, burner assembly 10 is provided composed of refractory interior member 12 and metallic outer shell 14. Passing axially through the inner refractory member 12 is at least one stepped cylindrical bore 16 having an upper portion 18 opening out the upper end of refractory member 12, an intermediate section 20 of relatively large diameter, containing passage ways leading to distribution holes in a lower section 22 which opens out the lower end of refractory member 12 and comprises the reaction zone. A circular distributing plate member 26 composed of refractory material is axially positioned in section 20 of stepped bore 16. Plate 26 contains a plurality of borings 30 for splitting the stream of reactant mixture into component streams prior to introduction into the reaction zone. The lower portion of section 18 of stepped boring 16 contains tapering flaring slots 32, one provided for each boring 30 in distributing plate 26 and axially aligned with the respective boring. In this manner, the stream of reactant mixture passing through section 18 passes into component streams through slots 32 and borings 30 prior to discharge into the reaction zone 22. The slots 32 and borings 30 should be so dimensioned that no appreciable change in the velocity of the reactant mixture streams is effected by its division into component streams.

A mixer 36, or plurality of such mixers, is provided in the upper end of boring section 18, and the impingement of these streams and initial mixing of the preheated hydrocarbon and oxidant is accomplished in the mixers prior to introduction into passage sectional 18 where a more intimate mixing is accomplished. Any suitable mixer 36 known to the prior art may be employed, and the length of passage may be decreased for mixers having a high mixing efficiency.

The plurality of streams of reactant mixture discharged from ports 30 strike the lower lip 40 of ignition chamber section 20 and are discharged radially inwardly to meet head-on to produce turbulence and intermixing of the component streams. The resultant stream of intimately mixed reactants is ignited across its entire cross-section by at least one flame holding ignition burner means 42 which discharges a firm high-velocity flame in the region of turbulent mixing. The high-velocity intimately-mixed stream of reactant mixture is combusted in a massive burning operation in reaction chamber 22. Due to the relatively high-velocity of the component streams of gaseous mixture passing flame holder means 42, it is imperative that the flame holder means discharges a firm, high-velocity flame capable of resisting blow-off by the stream of reactant gases, and capable of maintaining the initiation of the oxidation reaction at the upper end of the reaction zone 22. This latter is particularly true since it is important for high acetylene yield to maintain a critical time interval between the point in time of initiation of combustion (burner oxidation reaction) and the point in time of quenching. This critical time interval can only be maintained by holding the flame of the reaction at the proper location and providing massive burning of the reactant stream across its entire cross-section. Any burner, of which many are known to the prior art, capable of maintaining such firm high-velocity flame at the discharge end thereof, is suitable for employment in the apparatus of the invention.

Communicating with the downstream end of reaction chamber 22 is provided a quenching zone 44 into which a plurality of streams of water or other quenching fluid 46 are introduced through a plurality of nozzles 48 radially disposed about chamber 44. Quenching fluid in introduced through inlet conduit 50 and annular passage 52 to the quenching nozzle 48. The quenched reaction products then pass from quenching chamber 44 to apparatus (not shown) for separating the contained acetylene from the other reaction products.

It has been found that a single mixer 36 or a plurality of such mixers may be provided for introducing the reactant mixture into passage 18. It has also been found that to obtain the best operation, when employing the apparatus of the invention, at least one flame holder 42 should be employed to discharge flame in the vicinity of each component stream of reactant mixture entering the reaction zone. It has additionally been found that the positioning of flame holders to discharge inwardly and radially, in the manner shown in Fig. 1 of the drawing, produces the most effective results in accomplishing the massive burning required across the entire cross-section of the reactant stream.

It is, of course, to be understood that the stream of preheated mixture of reactants may be divided into any number (two or greater) of component streams by the provision of the number of ports 30 in distributing plate 26. It has been found, however, that undue complexity in the positioning of flame holding means, and the like, is introduced by the splitting of the stream of the reactant mixture into a large number of component streams. Additionally, the efficiency of the burning operation can decrease should too many component streams be provided because, under such circumstances, the massive burning effect across the entire cross-section may be lost with the burning effect approaching that of the process described hereinabove, wherein a refractory plate having a large number of flame holding ports is employed.

In one example of the operation of the apparatus of the invention, apparatus similar to that shown in the drawing was employed for the partial oxidation of methane with oxygen. 60,000 cubic feet per hour of methane, preheated to 635° C., was mixed with 32,000 cubic feet per hour of oxygen, preheated to 600° C., and fed through passage section 18 and four separate ports 30 to a 0.45 cubic foot reaction chamber having eight small high-velocity burners positioned in pairs, a pair in the vicinity of each of the four ports 30. The product gas leaving the reaction chamber was rapidly quenched with water spray and had the following analysis on a dry basis:

| Component: | Vol. percent |
| --- | --- |
| Acetylene, $C_2H_2$ | 7.9 |
| Olefins (mixed) | 0.7 |
| Hydrogen, $H_2$ | 55.0 |
| Carbon monoxide, CO | 25.5 |
| Carbon dioxide, $CO_2$ | 3.2 |
| Methane, $CH_4$ | 6.6 |
| Nitrogen, $N_2$ | 0.8 |
| Oxygen, $O_2$ | 0.3 |
| Total | 100.0 |

In another example, the same apparatus was employed to react a mixture of 80,000 cubic feet per hour of methane, preheated to 600° C., and 43,000 cubic feet per hour of oxygen, preheated to 600° C., and introduced in the manner described above. The product gas obtained had the following analysis on a dry basis:

| Component: | Vol. percent |
| --- | --- |
| Acetylene, $C_2H_2$ | 8.0 |
| Olefins (mixed) | 0.5 |
| Hydrogen, $H_2$ | 54.2 |
| Carbon monoxide, CO | 26.1 |
| Carbon dioxide, $CO_2$ | 3.2 |
| Methane, $CH_4$ | 7.2 |
| Nitrogen, $N_2$ | 0.7 |
| Oxygen, $O_2$ | 0.1 |
| Total | 100.0 |

It is, of course, to be understood that the apparatus of the invention can be utilized to handle larger throughputs. For example, if the diameter of the reaction chamber employed in the apparatus of the examples were enlarged 50 percent, the throughput of the unit could be raised to some 180,000 cubic feet per hour. Similarly, if the reaction chamber were lengthened, it would not only result in higher throughputs but would reduce the amount of radiated heat loss to the quenching fluid.

It is to be further understood that the reactor assembly of the invention may be employed in either the vertical or the horizontal position, the vertical position, however, being preferred.

What is claimed is:

1. A reactor assembly for the partial oxidation of hydrocarbons to produce acetylene comprising, in combination, inlet passage means for forming and conveying at least one preheated stream of fluid oxidant and hydrocarbon mixture into said reactor assembly; a divider communicating with said inlet passage means downstream thereof for separating said inlet streams into a plurality of component streams, a relatively flat ignition chamber defined by walls including a downstream end wall having a central opening therein; a distributor means between said divider and said ignition chamber for introducing said component streams at substantially the same velocity as said undivided stream radially head-on into said ignition chamber and against said end wall thereof to effect turbulent and intimate mixing of said component streams therein; flame-holding ignition burner means connected to said ignition chamber for providing a plurality of firm high-velocity flames discharging into said ignition chamber in the region of said turbulent mixing to ignite and maintain ignition of said partial oxidation reaction; and reaction chamber means downstream of and communicating directly with said ignition chamber end well opening wherein said partial oxidation reaction is completed and said acetylene is produced.

2. A reactor assembly for the partial oxidation of hydrocarbons to produce acetylene comprising, in combination, inlet passage means for forming and conveying at least one preheated stream of fluid oxidant and hydrocarbon mixture into said reactor assembly; means communicating with said inlet passage means downstream thereof for dividing said inlet streams into a plurality of component streams; a relatively flat ignition chamber defined by walls including a downstream end wall having a central opening therein; a transversely disposed distributor plate means between said dividing means and said ignition chamber, said distributor plate having for each of said component streams one boring of sufficiently large cross section to conduct said component streams at substantially the same velocity as said undivided stream into said ignition chamber and radially head-on against said end wall thereof to accomplish turbulent and intimate mixing of said component streams therein; flame-holding ignition burner means connected to said ignition chamber for providing a plurality of firm high-velocity flames discharging into said ignition chamber in the region of said turbulent mixing to ignite and maintain ignition of said partial oxidation reaction; and reacton chamber means downstream of and communicating directly with said ignition chamber end wall opening wherein said partial oxidation reaction is completed and said acetylene is produced.

3. Apparatus in accordance with claim 2 wherein said flame-holding ignition burner means are so positioned that at least one firm high-velocity flame is provided in the region of each of said component streams of reactant mixture entering said ignition chamber.

References Cited in the file of this patent

UNITED STATES PATENTS

| | | |
|---|---|---|
| 2,576,228 | Kinnaird | Nov. 27, 1951 |
| 2,585,221 | Briskin | Feb. 12, 1952 |
| 2,719,184 | Kosbahn et al. | Sept. 27, 1955 |
| 2,765,358 | Pichler et al. | Oct. 2, 1956 |